United States Patent
Pfeiffer (12)
(10) Patent No.: US 6,572,035 B1
(45) Date of Patent: Jun. 3, 2003

(54) ROTARY ACCELERATING APPARATUS FOR A CROP RESIDUE SPREADER OF AN AGRICULTURAL COMBINE

(75) Inventor: Dohn Pfeiffer, Davenport, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/158,363

(22) Filed: May 30, 2002

(51) Int. Cl.[7] .................. A01F 12/00; A01F 12/30; A01C 3/06; A01C 17/00; A01C 19/00
(52) U.S. Cl. .................. 239/650; 239/667; 239/672; 239/673; 239/681; 239/687; 239/689; 460/111; 460/112; 460/113
(58) Field of Search .................. 239/650, 667, 239/672, 673, 681, 682, 687, 689, 663; 460/111, 112, 113

(56) References Cited

U.S. PATENT DOCUMENTS

| | | | |
|---|---|---|---|
| 1,624,996 A | | 4/1927 | Stukenborg et al. |
| 1,895,488 A | | 1/1933 | Reisinger |
| 2,222,787 A | | 11/1940 | Stadler .................. 230/134 |
| 2,616,764 A | | 11/1952 | Parrish .................. 302/37 |
| 3,539,113 A | * | 11/1970 | Tyler .................. 239/673 |
| 3,889,883 A | | 6/1975 | Anderson .................. 239/679 |
| 4,442,979 A | * | 4/1984 | Kupper .................. 239/656 |
| 4,591,102 A | | 5/1986 | Clarke .................. 239/655 |
| 4,735,216 A | | 4/1988 | Scott et al. .................. 130/27 R |
| 4,892,504 A | | 1/1990 | Scott et al. .................. 460/112 |
| 5,215,500 A | | 6/1993 | Kirby .................. 460/111 |
| 5,288,017 A | * | 2/1994 | Halovitz .................. 239/687 |
| 5,556,042 A | | 9/1996 | Roberg .................. 241/101.76 |

* cited by examiner

Primary Examiner—Kevin Shaver
Assistant Examiner—Anuradha Ramana
(74) Attorney, Agent, or Firm—John William Stader; Rebecca L. Henkel (57) ABSTRACT

Rotary accelerating apparatus for a crop residue spreader of an agricultural combine, including blades mounted to a rotatable hub for rotation therewith, each of the blades having a surface oriented to face in the direction of rotation, the surface having opposite, spaced axial edges, and a mounting portion disposed intermediate the edges, and arms connected to and extending between the blades and the hub, each of the blades having first and second surface portions disposed primarily for contacting different flows of crop residue emanating from different locations for integrating, accelerating and discharging the flows for dispersal over an agricultural field, the mounting location of the blades, and the relative shapes and sizes of the portions thereof providing advantageous load distribution and transfer characteristics.

18 Claims, 6 Drawing Sheets

ROTARY ACCELERATING APPARATUS FOR A CROP RESIDUE SPREADER OF AN AGRICULTURAL COMBINE

TECHNICAL FIELD

This invention relates generally to a crop residue spreader for an agricultural combine, and more particularly, to rotary crop accelerating apparatus for a spreader, the accelerating apparatus including blades which are supported advantageously for optimally distributing loads generated by contact with and acceleration of crop residue such as chaff and straw, and which blades are optimally shaped and located for receiving and accelerating flows of chaff and optionally straw for discharge from the spreader and distribution over an agricultural field.

BACKGROUND ART

Rotary crop residue spreaders for agricultural combines are well known in the art. Reference in this regard, Clarke U.S. Pat. No. 4,591,102, issued May 22, 1986, which discloses a representative chaff spreader for a combine harvester including rotary crop accelerating apparatus comprising fans having a plurality of radially extending blades, the fans each being rotatable for propelling crop residue outwardly from a housing partially containing the fan. Other known spreaders utilize a rotating disk supporting a plurality of radially extending blades or impellers on one surface thereof for engaging and propelling crop residue or other material in a radially outward direction. Reference in this regard, Scott et al. U.S. Pat. No. 4,892,504, issued Jan. 9, 1990 to Gehl Company.

An observed shortcoming, however, of both the known fan type accelerating apparatus and the known disk type accelerating apparatus, is that loads generated by the rotation of the fan blades and from contact with the crop residue are not ideally or optimally transferred to supporting structure such as a central hub or casting in the instance of the fan type apparatus, and to the supporting disk in the instance of the disk type apparatus, such that the blades will typically have a relatively narrow profile and the spreaders will have a less than optimal capacity, operability and durability. Still further, it is desired to provide a crop accelerating apparatus for a spreader which is better capable of handling different or mixed crop residue flows such as straw and chaff. Straw, for the present purposes, typically includes bean and grain stalks and stems, corn cobs, weeds, vines, and the like, is typically relatively heavy, and is delivered to the spreader from above. Chaff, which typically includes more intimately associated aspects of the bean, grain or other crop being harvested, is typically blown or otherwise delivered to the spreader from a more forward direction, comprises small constituent elements compared to the straw flow, and is typically less dense or voluminous compared to the straw flow.

Therefore, what is sought is rotary crop residue accelerating apparatus for a spreader of a agricultural combine which overcomes the shortcomings and provides the advantageous properties discussed above.

SUMMARY OF THE INVENTION

According to one preferred aspect of the present invention, rotary accelerating apparatus for a crop residue spreader of an agricultural combine which overcomes the shortcomings and provides the advantageous properties discussed above, is disclosed. The present rotary accelerating apparatus is particularly will adapted for receiving flows of chaff and straw from different directions and having different densities and other characteristics, and accelerating the flows and discharging them from the spreader together and relatively evenly over an agricultural field. The present apparatus includes a hub mountable on a rotatable member of the spreader, such as a shaft of a hydraulic, electric or other motor, for rotation therewith in a predetermined rotational direction about a rotational axis oriented generally horizontally or at a small acute angle to horizontal. The apparatus includes a plurality of blades disposed at angularly spaced locations around the rotational axis and extending radially outwardly from the axis and the hub. Each of the blades has a surface oriented to face in the rotational direction, the surface having a first axial edge and a second axial edge axially spaced from and opposite of the first axial edge. Each of the blades additionally includes a mounting portion disposed intermediate the first and second axial edges. The apparatus includes a plurality of arms connected to and extending radially outwardly from the hub at angularly spaced locations around the rotational axis and connected to the mounting portion of the blades, respectively, for supporting the blades for rotation with the hub about the axis. The surface of each of the blades includes a first surface portion extending from the first axial edge to about the mounting portion and having a predetermined first axial extent therebetween and a predetermined first radial extent relative to the rotational axis, and a second surface portion extending from about the mounting portion to the second axial edge having a predetermined second axial extent therebetween and a predetermined second radial extent, the first axial extent being substantially greater than the second axial extent and the first radial extent being substantially greater than the second radial extent, and wherein the first and second surface portions of the blade are positioned one relative to the other in relative to the rotational axis such that when the hub is mounted to the rotational member, the first surface portions of the blades will be located primarily in the path of the flow of chaff from the combine and the second surface portions will be located primarily in the path of the flow of straw from the combine such that more desirable load distribution and crop residue handling properties are achieved. For instance, centrifugal forces resulting from the rotation, and applied forces resulting from contact with the crop residue have been found to be better distributed and transferred to the arms, hub and rotatable members, resulting in improved durability. The profile of the blades also have been found to provide better integration of the different crop residue flows, such that there is less rejection of the chaff by the heavier, bulkier straw and less accumulation of the crop residue in the spreader.

According to a preferred aspect of the invention, each of the blades of the rotary accelerating apparatus has an axially extending radially outermost edge having a stepped or notched shape including a first edge portion extending along the first surface portion and a second edge portion extending along the second surface portion radially inwardly of the first edge portion, which configuration has been found to favorably affect the load distribution and integration of the crop residue flows, as well as the outflow of the accelerated crop residue. The larger diameter first surface portion of the blades protruding more forwardly facilitates the engagement, acceleration, and distribution of the chaff for a wide and uniform distribution thereof over the field. The smaller diameter more rearward second surface portion of the blades provides an improved means for engaging the straw and containing the straw in the upwardly open inlet region of the spreader, resulting in less rejection, and other adverse effects on the chaff flow along the more forward first surface portions of the blades. As a result, a consolidated advantageous effect on chaff and straw distribution over a field is achieved. As another advantage, the location of the mounting portion of the blades and connection to the supporting arms and hub is not constrained, and can be varied as required to achieve a desired force loading.

According to another preferred aspect of the invention, rotary accelerating apparatus for a crop residue spreader of an agricultural combine is disclosed, which includes a hub mountable on a rotatable member of the spreader for rotation therewith in a predetermined rotational direction about a rotational axis, the hub having a first axial end portion and a second axial end portion opposite of and axially spaced from the first axial end portion; a mounting bracket mounted to the first axial end portion of the hub and including a plurality of radially outwardly extending portions at spaced locations around the rotational axis or hub; a plurality of blades mounted to the radially outwardly extending portions, respectively, for rotation therewith about the rotational axis, each of the blades having a first axial edge portion located about axially coincident with the axial end portion of the hub and the radially outwardly extending portions, and a second axial edge portion opposite the first axial edge portion; and a disk mounted to at least some of the second axial edge portions of the blades and for rotation therewith for enclosing an adjacent axial end of spaces between adjacent ones of the blade.

A principle advantage of this embodiment is the support of the disk by the blades as opposed to the reverse, that is, the support of the blades by the disk, it having been found that loads resulting from the rotation and contact with the crop residue being more favorably distributed by the present arrangement. This arrangement also demonstrates the variability of the location of the attachment of the blades to the arms.

DETAILED DESCRIPTION OF THE INVENTION

Figure 1:
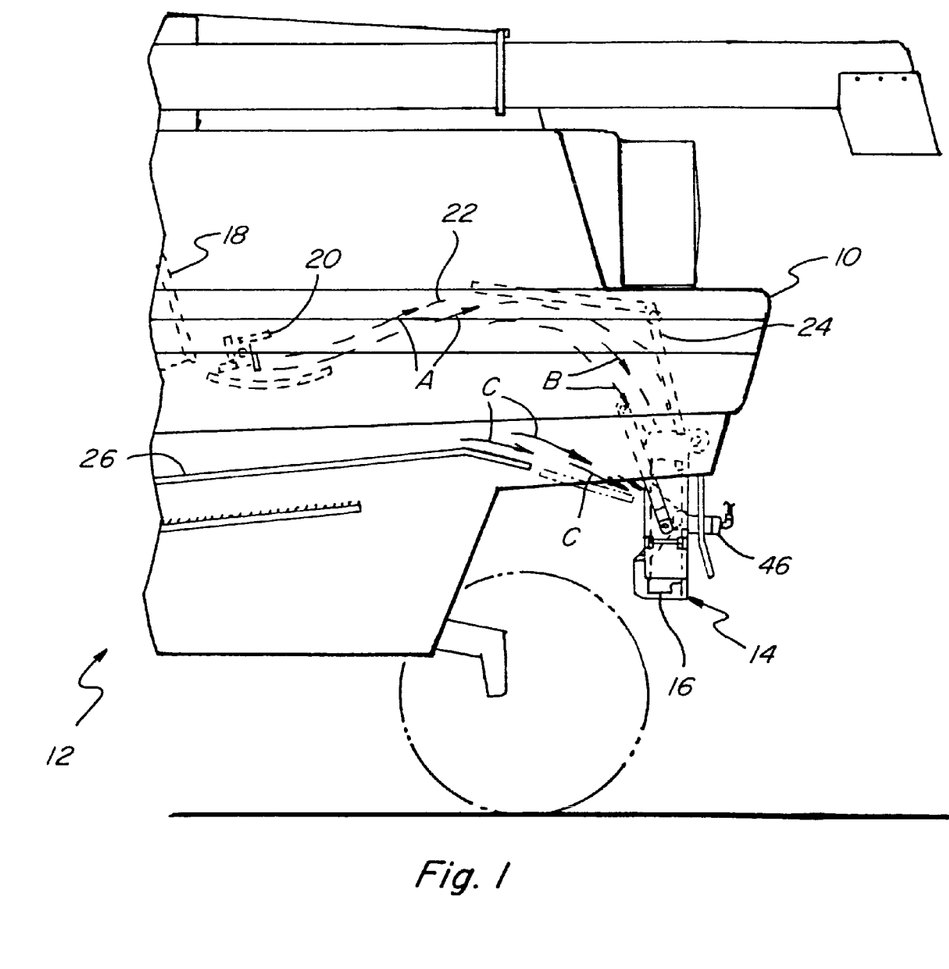
FIG. 1 is a fragmentary simplified side view of an agricultural combine including a crop residue spreader including crop residue accelerating apparatus according to the present invention.

Referring now to the drawings, wherein preferred embodiments of the present invention are shown, in FIG. 1, a rear end 10 of a typical self-propelled agricultural combine 12 is shown, including a rotary crop residue spreader 14 including rotary crop residue accelerating apparatus 16 constructed and operable according to the teachings of the present invention. Briefly, combine 12 includes a threshing mechanism 18 which separates straw, including stalks, cobs, stems, weeds and other larger plant matter, from the harvested crop, and feeds that material to a rotating straw walker or beater mechanism 20 which carries or propels a flow 22 of the straw rearwardly, denoted by arrows A through an internal duct of combine 12 and against a deflector plate 24, which helps deflect the flow 22 downwardly, denoted by arrows B, into spreader 14. At the same time, cleaning apparatus 26 of combine 12 separates chaff, such as seed pods and husks, from the threshed grain, and directs or blows a flow of the chaff, denoted by arrows C, rearwardly into spreader 14.

Figure 2:
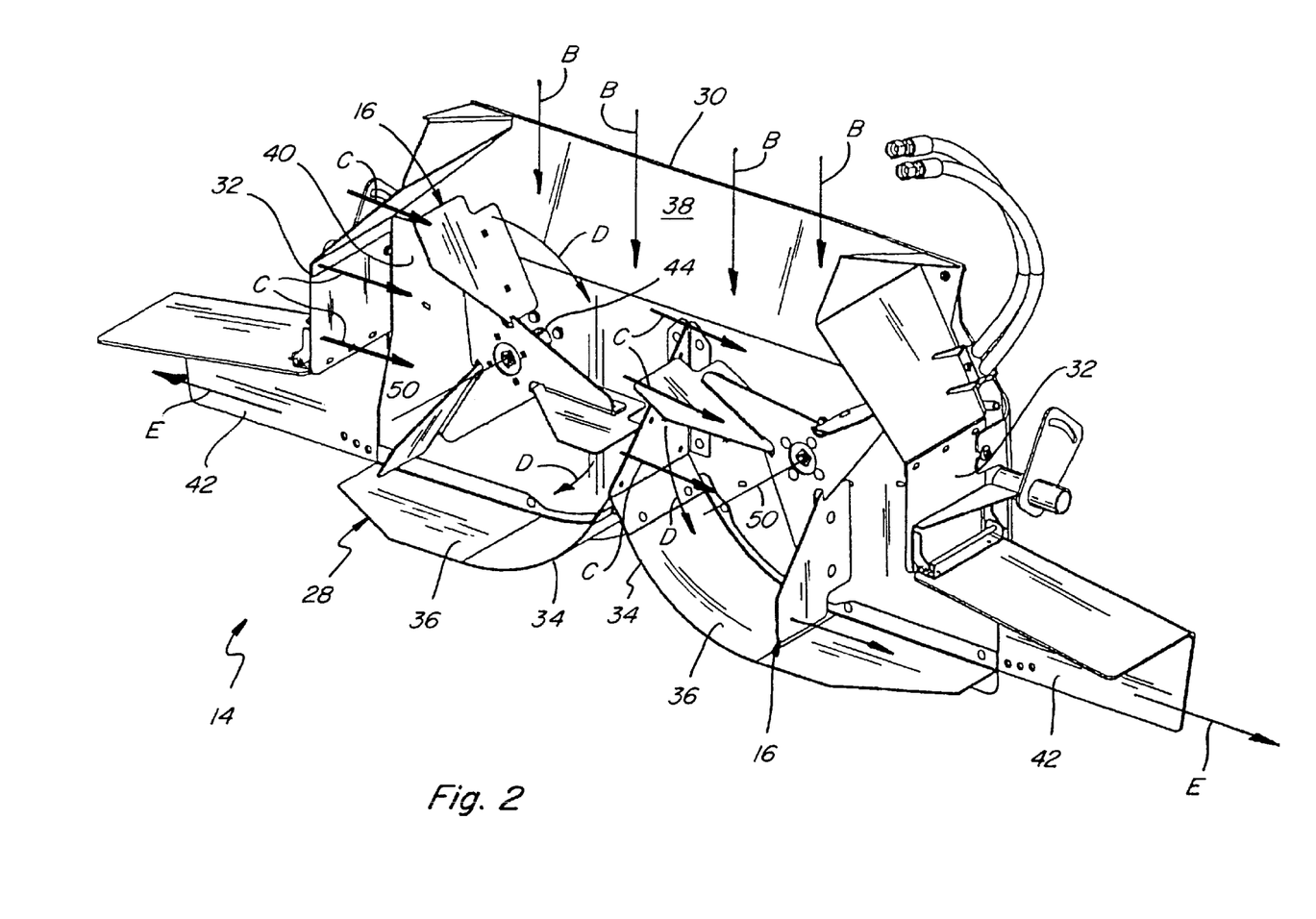
FIG. 2 is an enlarged perspective view of the spreader of FIG. 1.

Referring also to FIG. 2, wherein only spreader 14 is shown, spreader 14 includes a housing 28 having a rear wall 30 and side walls 32 and 34, defining and partially enclosing a pair of side-by-side spaces 36, each including a crop residue accelerating apparatus 16 for rotation therein in a predetermined rotational direction, as denoted by arrows D. Housing 28 defines an upwardly and forwardly open inlet region 38 positioned to receive the generally downwardly extending flow of straw, denoted by arrows B, and a forwardly and upwardly open region 40 positioned for receiving the flow of chaff, denoted by arrows C, such that rotation of crop residue accelerating apparatus 16 in the rotational directions D will accelerate and discharge the flows through opposite sidewardly facing openings 42, as denoted by arrows E. Each crop residue accelerating apparatus 16 is mounted on a rotational shaft 44 for rotation therewith, each shaft 44 extending through an opening in rear wall 30 and being drivingly connected to a motor 46, which can be, for instance, an electric motor, fluid motor, or the like (FIG. 1), operable for rotating shaft 44 and crop residue accelerating apparatus 16 for accelerating and propelling or discharging the crop residue, as denoted by arrows E, a desired distance from spreader 14.

Figures 3, 4:
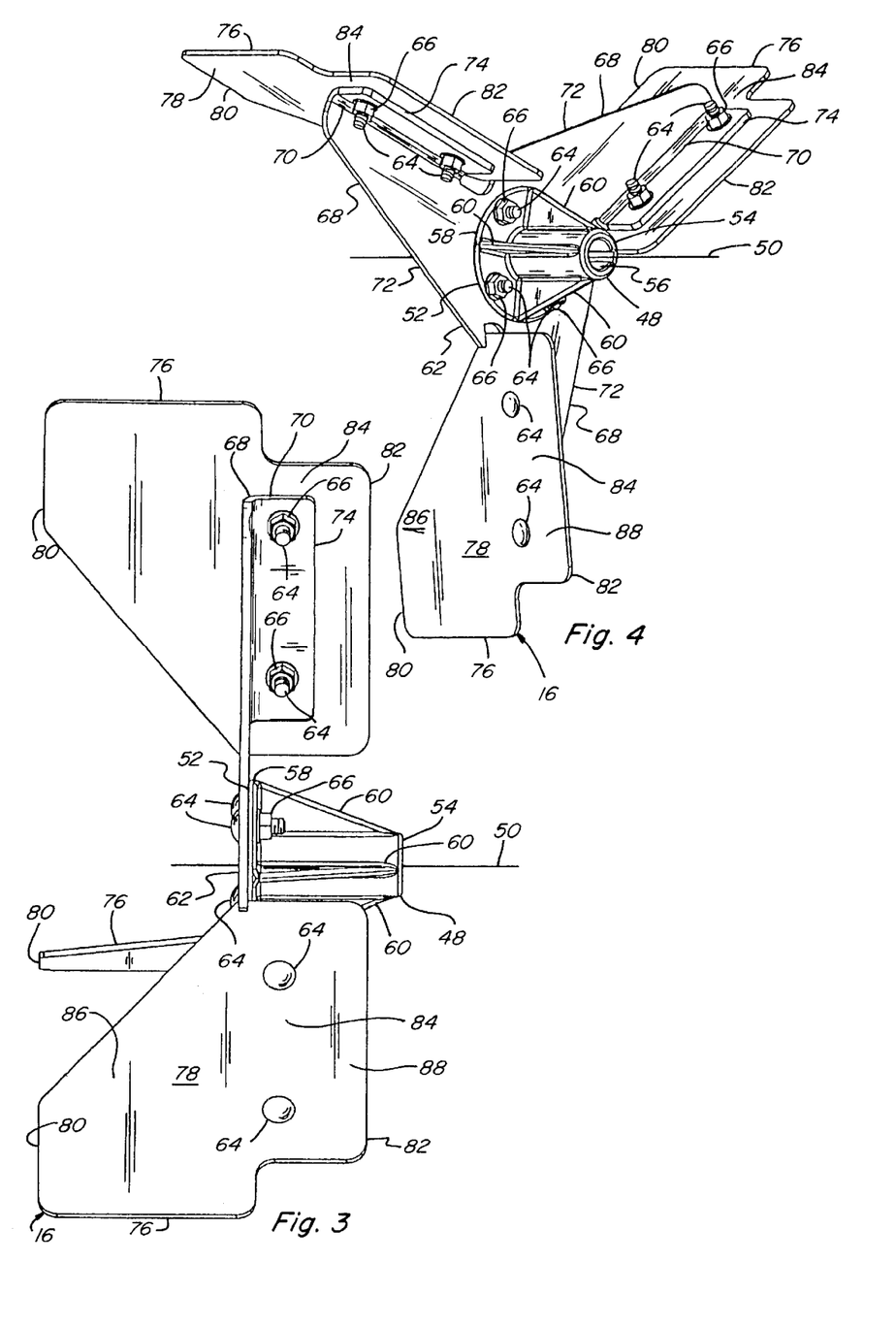
FIG. 3 is an enlarged side view of the accelerating apparatus of the spreader of FIG. 1.
FIG. 4 is a rear perspective view of the accelerating apparatus of FIG. 3.

Referring also to FIGS. 3 and 4, which show one of the crop residue accelerating apparatus 16 representative of the other apparatus 16, each apparatus 16 includes a central hub 48 which mounts on shaft 44 for rotation therewith in the rotational direction D (FIG. 2), about a rotational axis 50 of shaft 44. Hub 48 is preferably a tubular or hollow cylindrical or similar shape member including a first axial end portion 52, a second axial end portion 54 axially spaced from and opposite axial end portion 52, and an axial hole 56 at least partially through hub 48 for receiving shaft 54. First axial end portion 52 preferably includes a radially outwardly extending annular flange 58 therearound, supported by a plurality of axially extending ribs 60 connected to flange 58 and hub 48 at angularly spaced locations therearound. A generally planar or flat blade support member 62, preferably of unitary construction, is mounted to flange of first axial end portion 52 of hub 48 in a suitable manner such as by a plurality of bolts 64 which pass through holes in flange 58 and member 62, and which are secured by nuts 66, for rotation with hub 48 about rotational axis 50. Member 62 preferably extends at least substantially around hub 48 and includes a plurality of arms 68 located at angularly spaced locations around axis 50 and extending radially outwardly relative to hub 48. Each arm 68 preferably has a generally radially outwardly extending leading edge portion 70, and a trailing edge portion 72 which is angularly related to leading edge portion 70. Each leading edge portion 70 includes an elongate tab 74 oriented so as to have a surface facing the rotational direction.

A blade 76 is suitably mounted to each arm 68 so as to extend radially outwardly relative to hub 48, preferably by a plurality of bolts 64 which pass through holes in tabs 74 and are secured by nuts 66. Each blade 76 has a surface 78 oriented to face in the rotational direction (arrows D in FIG. 2) and including a first axial edge 80, and a second axial edge 82 opposite edge 80, edges 80 and 82 extending generally radially outwardly relative to rotational axis 50, and each blade 76 including an intermediate or mounting portion 84 preferably located intermediate or in spaced relation between edges 80 and 82.

Figure 5:
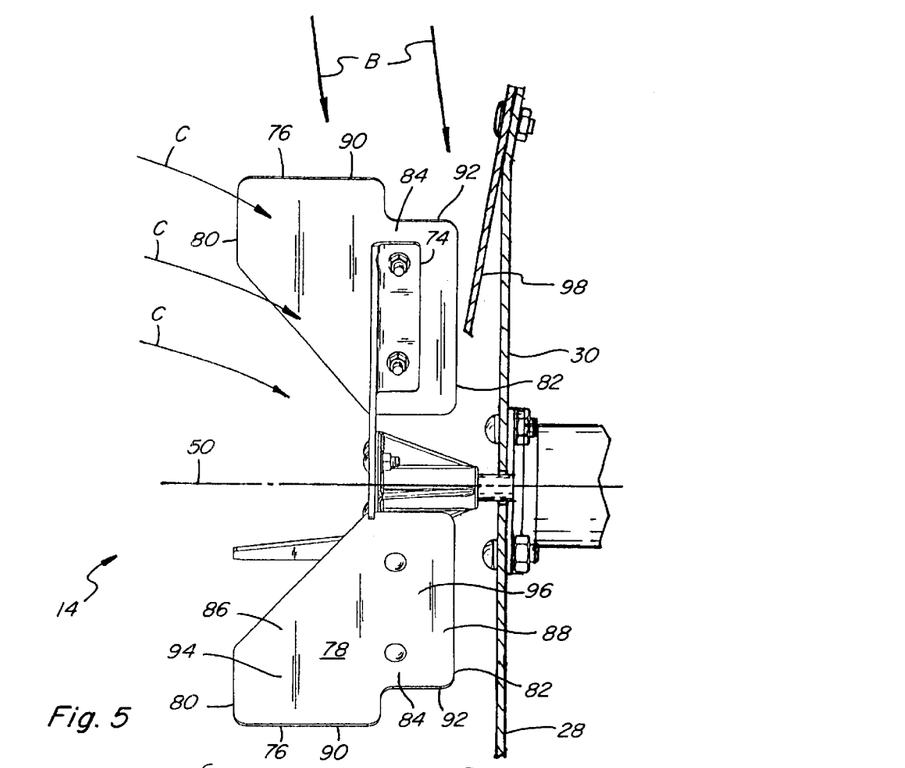
FIG. 5 is a fragmentary sectional view of the spreader of FIG. 1, showing chaff and straw flows in relation to accelerating apparatus thereof.
Figure 6:
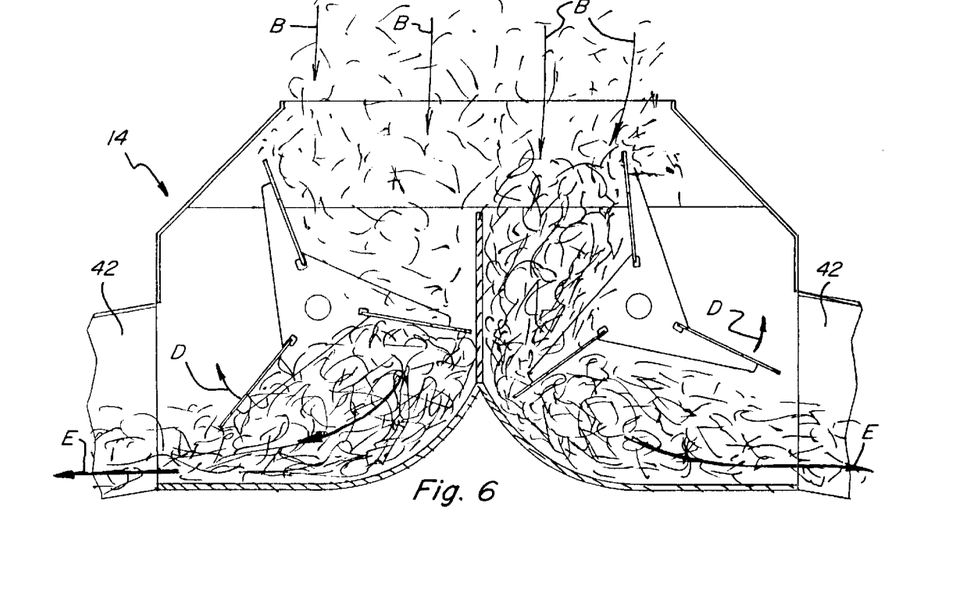
FIG. 6 is a sectional view of the spreader of FIG. 1, illustrating rotation of accelerator apparatus thereof and acceleration of crop residue thereby.

Referring also to FIGS. 5 and 6, surface 78 of each blade 76 includes a first surface portion 86 extending from first axial edge 80 generally or about to mounting portion 84, and a second surface portion 88 extending generally or about from mounting portion 84 to second axial edge 82, first surface portion 86 being positioned generally or primarily in the path of the flow of chaff denoted by arrows C, and second surface portion 88 being positioned primarily in the path of the flow of straw, denoted by arrows B, such that the chaff and straw flows will be compressed by the rotation of blades 76 in the rotational direction, denoted by arrows D, and expelled or discharged at a greater velocity through sidewardly facing openings 42 of spreader 14 as denoted by arrows E, and distributed or spread over the agricultural field (not shown). Referring in particular to FIG. 5 first surface portion 86 of each blade 76 has an outward radial extent from rotational axis 50 to a radial outer edge portion 90 thereof which is substantially greater than the radial outward extent of second surface portion 88 to a radial outer edge portion 92 thereof, such that edge portions 90 and 92 together have a stepped or notched shape, and a central region 94 of first surface portion 86 will h)e offset radially outwardly of a central region 96 of second surface portion 88.

The greater axial and radial outward extents of first surface portions 86 of blades 76 compared to second surface portions 88 thereof which provides the stepped or notched shape, and the different positioning of surface portions 86 and 88 relative to the straw and chaff flows as denoted by arrows B and C, respectively, is important and desirable as it provides a larger surface area for receiving and contacting the chaff and accelerating the chaff outwardly from spreader 14 in a relatively wide discharge pattern for distributing the chaff over a desirably large area of a field, and it provides a favorable resultant force loading on blades 76 and distribution or transfer of the force loads to arms 68. More particularly in this latter regard, blades 76 are shaped and sized, and mounting portions 84 thereof are located, such that the flow of straw denoted by arrows B, which is relatively heavy, is directed more to and contacted by the stronger and better supported region of each blade 76 which primarily includes second surface portion 88 and mounting portion 84, whereas the lighter flow of chaff denoted by arrows C is directed more to and contacted primarily by first surface portion 86 and mounting portion 84. In this regard, it should be observed in FIG. 5 that arms 68 are generally aligned with about the center of the path of the flow of straw, and that central region 96 of second surface portion 88 of each blade 76 is backed up and supported by tab 74 of arm 68 so as to advantageously strengthen central region 96 and better transfer resulting loads thereon to arm 68. It should also be noted that rear wall 30 of housing 28 includes an optional deflector plate 98 positioned for deflecting or guiding more rearwardly located portions of the flow of straw B forwardly toward blades 76.

Second axial edges 82 of blades 76 is positioned in sufficiently close axially spaced relation to deflector plate 98 and rear wall 30 such that apparatus 16 is able to contact and carry the straw into space 36 such that the straw has less of a tendency to build up in the rear regions of spreader 14. Still further, it should be noted that the extent of blade support members 62 between adjacent ones of blades 76 provides at least a partial barrier to keep longer plant material from wrapping around blades 76 and hub 48.

Figure 7:
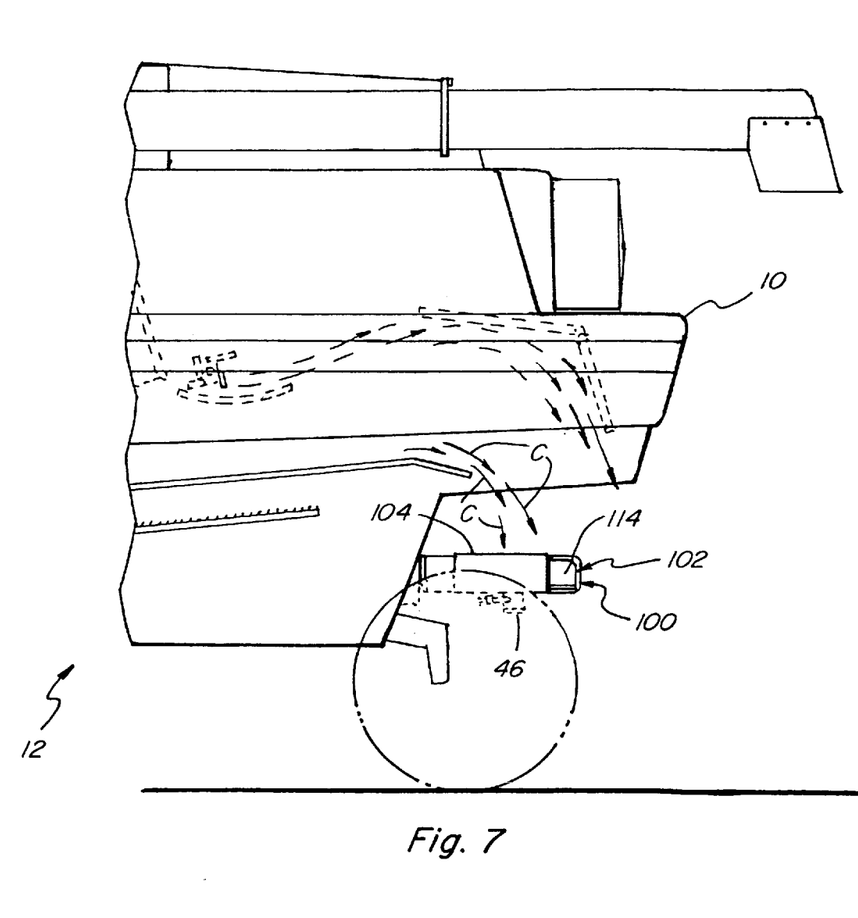
FIG. 7 is a simplified fragmentary side view of an agricultural combine including another crop residue spreader including crop residue accelerating apparatus of the invention.
Figures 8, 9:
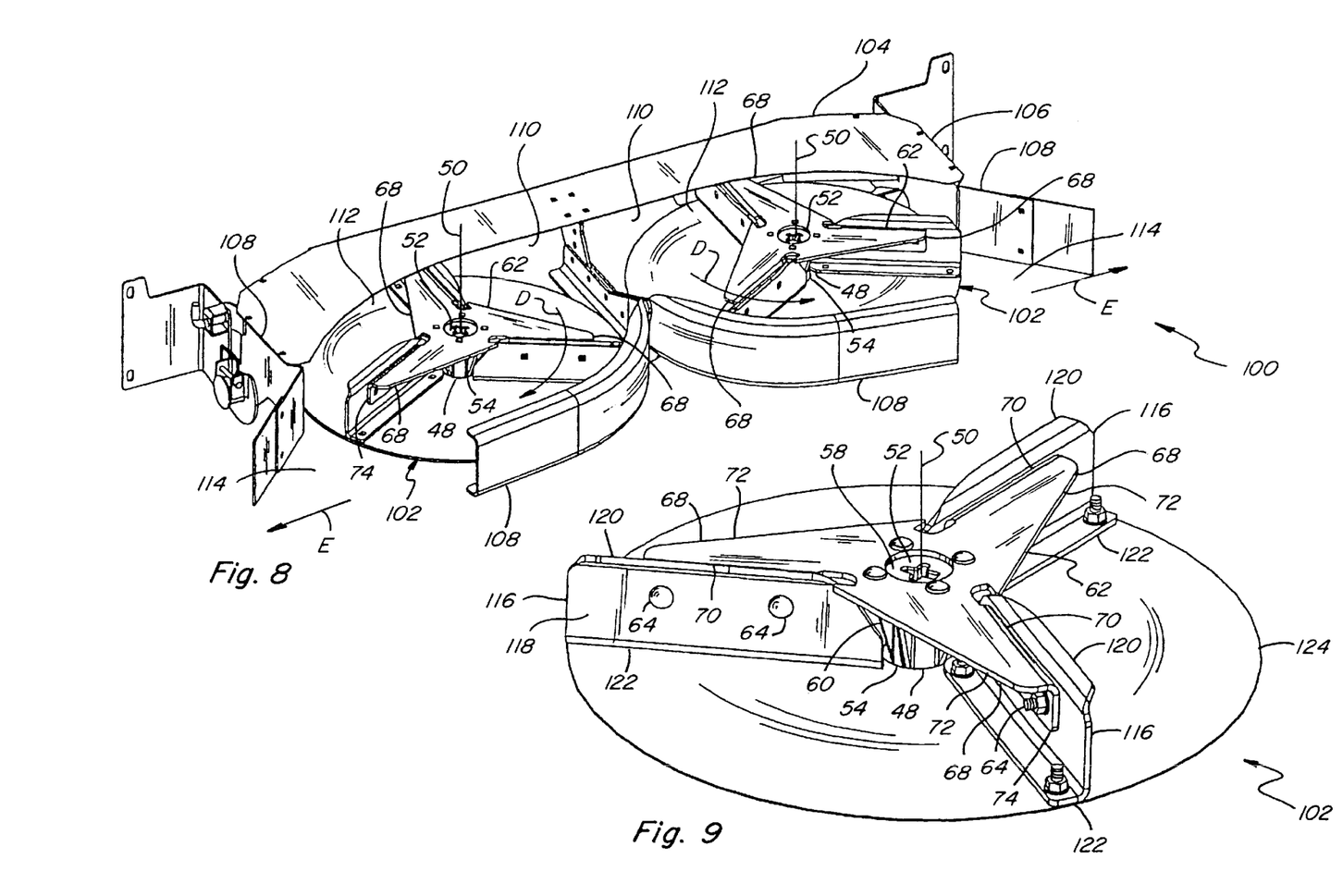
FIG. 8 is a perspective view of the spreader of FIG. 7.
FIG. 9 is a perspective view of the accelerating apparatus of FIGS. 7 and 8.

Referring to FIGS. 7, 8 and 9, in FIG. 7, rear end 10 of agricultural combine 12 is shown including a rotary crop residue spreader 100 including rotary crop accelerating apparatus 102 constructed and operable according to the teachings of the present invention, like parts of spreader 100, accelerating apparatus 102 and spreader 14 and apparatus 16 being identified by like numbers. Spreader 100 differs from previously discussed spreader 14 in a number of important respects, including in that spreader 100 is oriented more horizontally compared to the more vertical orientation of spreader 14, and includes a housing 104 comprising a partial upper wall 106 and opposing side walls 108 partially enclosing spaces 110 containing a pair of accelerating apparatus 102. Each space 110 includes an upwardly open inlet region 112 through which a flow of chaff denoted by arrows C, and possibly some of a flow of straw D, is received, for acceleration by accelerating apparatus 102 and discharge through sidewardly facing discharge openings 114 for distribution over an agricultural field.

Referring more particularly to FIGS. 8 and 9, each crop residue accelerating apparatus 102 includes a central hub 48 which mounts on a shaft of a motor 46 (FIG. 7) which can be, for instance, an electric motor, fluid motor, or the like, operable for rotating the shaft and crop residue accelerating apparatus 102 in a rotational direction, denoted by arrows D (FIG. 8) for accelerating and propelling or discharging the crop residue a desired distance from spreader 100 as denoted by arrows E (FIG. 8). Hub 48, again, is preferably a tubular or hollow cylindrical or similar shape member including a first axial end portion 52, a second axial end portion 54 axially spaced from an opposite axial end portion 52, and an axial hole (not shown) for receiving the shaft of motor 46. Also as before, first axial end portion 52 of hub 48 includes a radially outwardly extending annular flange 58 therearound, supported by a plurality of axially extending ribs 60 connected to flange 58 and hub 48 at angularly spaced locations therearound. A generally planar or flat blade support member 62 is mounted to flange 58, again in a suitable manner, such as by a plurality of bolts for a rotation with hub 48 about a rotational axis 50. Member 62 preferably extends at least substantially around hub 48, and includes a plurality of arms 68 located at angularly spaced locations around axis 50 and extending radially outwardly relative to hub 48. Each arm 68 preferably has a generally radially outwardly extending leading edge portion 70, and a trailing edge portion 72 which is angularly related to leading edge portion 70. Each leading edge portion 70 includes an elongate tab 74 oriented so as to have a surface facing the rotational direction. Referring more particularly to FIG. 9, a blade 116 is mounted to each arm 68 so as to extend radially outwardly relative to hub 48, preferably by a plurality of bolts 64 secured by nuts or the like. Each blade 116 has a surface 118 oriented to face in the rotational direction and including a first axial edge 120, and a second axial edge 122 opposite edge 120, edges 120 and 122 extending generally radially outwardly relative to rotational axis 50, and edge 120 being oriented to extend also in the direction of rotation. A generally circular disk 124 is suitably mounted to second axial edges 122 of blades 116 in concentric relation therewith, by a plurality of bolts or the like, so as to be supported by blades 116 and enclose the axial end of spaces between adjacent ones of blades 116. An important advantage of this construction is that because blades 116 are supported by blade support member 62 and in turn support disk 124, instead of disk 124 supporting blades 116, disk 124 can be of a lighter weight construction, if desired. This construction demonstrates the versatility of the present mounting arrangement utilizing blade support members 62 and central hub 48, it being evident that this arrangement can be utilized to support blades at any desired axial location therealong. As another advantage of the mounting and support of blades 116 adjacent first axial edge 120 thereof, edges 120 of the blades can be oriented so as to extend at least partially into the direction of rotation of the accelerating apparatus, as shown here, to provide more aggressive gathering of chaff into the spreader.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates several preferred embodiments of the invention and methods of operation of the same; however, concepts, as based upon the description, may be employed in other embodiments without departing from the scope of the invention. Accordingly, the following claims are intended to protect the invention broadly as well as in the specific form shown.

What is claimed is:

1. Rotary accelerating apparatus for a crop residue spreader of an agricultural combine, for receiving a flow of chaff flowing along a first path from a threshing apparatus of the combine and a flow of straw flowing along a second path from the combine and accelerating the flows and discharging them from the spreader onto an agricultural field, comprising:

a hub mountable on a rotatable member of the spreader for rotation therewith in a predetermined rotational direction about a rotational axis;

a plurality of blades disposed at angularly spaced locations around the rotational axis and extending radially outwardly therefrom, each of the blades having a surface oriented to face in the rotational direction, the surface having a first axial edge and a second axial edge axially spaced from and opposite of the first axial edge, each of the blades having a mounting portion disposed intermediate the first and second axial edges, a plurality of arms connected to and extending radially outwardly from the hub at angularly spaced locations around the rotational axis and connected to the mounting portion of the blades respectively for supporting the blades for rotation with the hub, the surface of each of the blades including a first surface portion extending from the first axial edge to the mounting portion and having a predetermined first axial extent therebetween and a predetermined first radial extent relative to the rotational axis, and a second surface portion extending from the mounting portion to the second axial edge having a predetermined second axial extent therebetween and a predetermined second radial extent relative to the rotational axis, the first axial extent being substantially greater than the second axial extent and the first radial extent being substantially greater than the second radial extent; and wherein the first and second surface portions of the blades are positioned one relative to the other and relative to the rotational axis such that when the hub is mounted to the rotatable member, the flat surface portions of the blades will be located primarily in the path of the flow of chaff from the combine and the second surface portions will be located primarily in the path of the flow of straw from the combine.

2. Rotary accelerating apparatus of claim 1, wherein each of the blades has an axially extending radially outermost edge having a stepped shape including a first edge portion extending along the first surface portion and a second edge portion extending along the second surface portion radially inwardly of the first edge portion.

3. Rotary accelerating apparatus of claim 1, wherein the first surface portion of each of the blades has a central region and the second surface portion of each of the blades has a central region, the central region of the first surface portion being offset radially outwardly of the central region of the second surface portion.

4. Rotary accelerating apparatus of claim 1, wherein the arms comprise portions of a unitary member.

5. Rotary accelerating apparatus of claim 4, wherein the unitary member comprises a substantially planar axially facing plate mounted to the hub and aligned substantially with the mounting portions of the blades.

6. Rotary accelerating apparatus of claim 5, wherein each of the arms includes a mounting flange having a surface facing in the rotational direction in surface-to-surface contact with the blade to which the arm is connected, such that the flange supports and reinforces the second surface portion of the blade.

7. A rotary chaff and straw spreader for an agricultural combine, for receiving rearwardly directed flows of straw and chaff discharged from different portions of the combine, and accelerating and discharging the flows for distribution over an agricultural field, comprising:

a housing including rear wall and side wall portions defining a space including a generally upwardly facing open region for receiving the flow of straw, a generally forwardly facing open region for receiving the flow of chaff, and a sidewardly facing open region for discharging the straw and chaff therethrough; and rotary chaff and straw accelerating apparatus supported in the space for rotation in a predetermined rearwardly extending rotation axis, the apparatus including a central hub disposed for rotational about the rotational axis and a plurality of arms extending radially outwardly from the hub at angularly spaced locations therearound, each of the arm supporting a radially outwardly extending blade for rotation in the space about the rotational axis, each of the blades including a surface facing in the rotational direction including a first surface portion extending forwardly from the arm and a second surface portion extending rearwardly from the arm, the first surface portion having a predetermined first radial outward extent from the rotational axis and the second surface portion having a second radial outward extent from the rotational axis less than the first radial outward extent, the first surface portions of the blades being positioned relative to the hub so as to rotate therewith adjacent to the forwardly facing open region so as to be located primarily in the flow of chaff from the combine, and the second surface portions of the blades being located relative to the hub so as to rotate therewith adjacent to the upwardly facing open region so as to be located primarily in the flow of straw from the combine.

8. The rotary chaff and straw spreader of claim 7, wherein the first surface portion of each of the blades has a central region and the second surface portion has a central region, the central region of the first surface portion being offset radially outwardly relative to the central region of the second surface portion.

9. The rotary chaff and straw spreader of claim 7, wherein each of the arms includes a surface portion oriented to face in the rotational direction located in overlaying or underlaying relation to at least a portion Of the second surface portion of the blade supported thereby.

10. The rotary chaff and straw spreader of claim 9, wherein the arms comprise a unitary member.

11. The rotary chaff and straw spreader of claim 7, wherein each of the blades includes a radially outermost edge including a notched portion radially outwardly of the second surface portion of the blade.

12. The rotary chaff and straw spreader of claim 7, wherein the rotary chaff and straw accelerating apparatus comprises at least three of the blades.

13. The rotary chaff and straw spreader of claim 7, wherein the arms comprise a generally flat, forwardly facing substantially continuous surface extending around the hub.

14. Rotary accelerating apparatus for a crop residue spreader of an agricultural combine, comprising:
   a hub mountable on a rotatable member of the spreader for rotation therewith in a predetermined rotational direction about a rotational axis;
   a plurality of blades disposed at angularly spaced locations around the rotational axis and extending radially outwardly therefrom, each of the blades including a generally radially outwardly extending upper axial edge portion and a generally radially outwardly extending lower axial edge portion;
   a plurality of arms extending radially outwardly from the hub at angularly spaced locations around the rotational axis and connected to the blades, respectively, at or adjacent to the upper axial edge portions thereof for supporting the blades at the angularly spaced locations for rotational movement with the hub; and
   a disk mounted to and supported by the lower axial edge portions of the blades for rotation therewith enclosing a lower axial end of spaces between adjacent ones of the blades.

15. The rotary accelerating apparatus of claim 14, wherein the upper axial edge portion of each of the blades includes an endmost edge which extends at least partially toward the rotational direction.

16. The rotary accelerating apparatus of claim 15, wherein each of the arms is disposed in supporting relation to the upper axial edge portion of the blade connected to the arm.

17. The rotary accelerating apparatus of claim 14, wherein the arms comprise the unitary planar member having an upwardly facing at least generally planar surface extending around an upper axial end of the hub located adjacent to the upper axial edge portions of the blades.

18. Rotary accelerating apparatus for a crop residue spreader of an agricultural combine, for receiving a flow of the crop reside and accelerating and discharging the flow from the spreader onto an agricultural field, comprising:
   a hub mountable on a rotatable member of the spreader for rotation therewith in a predetermined rotational direction about a rotational axis, the hub having a first axial end portion and a second axial end portion opposite of and axially spaced from the first axial end portion;
   a member mounted to the first axial end portion of the hub and including a plurality of radially outwardly extending portions at spaced locations around the rotational axis;
   a plurality of blades mounted to the radially outwardly extending portions, respectively, for rotation therewith about the rotational axis, each of the blades having a first axial edge portion located about axially coincident with the axial end portion of the hub and the radially outwardly extending portions, and a second axial edge portion opposite the first axial edge portion; and
   a disk mounted to at least some of the second axial edge portions of the blades for enclosing an adjacent axial end of spaces between adjacent ones of the blades for rotation therewith.

* * * * *